(12) United States Patent
Kastl et al.

(10) Patent No.: US 6,248,405 B1
(45) Date of Patent: Jun. 19, 2001

(54) MATERIAL CONTAINING POLYREACTION PRODUCTS FOR THE COATING LAYER OF PLANAR STRUCTURES

(75) Inventors: Bernd Kastl, Bietigheim-Bissingen; Milko Ess, Freiberg; Bernhard Jung, Weinsberg, all of (DE)

(73) Assignee: DLW Aktiengesellschaft (DE)

(*) Notice: Subject to any disclaimer, the term of this patent is extended or adjusted under 35 U.S.C. 154(b) by 0 days.

(21) Appl. No.: 09/380,666

(22) PCT Filed: Mar. 5, 1998

(86) PCT No.: PCT/EP98/01252
§ 371 Date: Sep. 7, 1999
§ 102(e) Date: Sep. 7, 1999

(87) PCT Pub. No.: WO98/40427
PCT Pub. Date: Sep. 17, 1998

(30) Foreign Application Priority Data

Mar. 7, 1997 (DE) .............................. 197 09 477

(51) Int. Cl.⁷ .............. B05D 1/38; C08F 2/48; B32B 19/04; B32B 27/38; B32B 27/26
(52) U.S. Cl. .............. 427/411; 427/412; 427/508; 427/513; 427/407.1; 428/455; 428/456

(58) Field of Search .............. 427/444, 508, 427/513, 516, 407.1, 411, 412; 428/70, 71, 354, 413, 455, 456

(56) References Cited

U.S. PATENT DOCUMENTS

| | | | |
|---|---|---|---|
| 4,210,693 | * 7/1980 | Regan et al. | 428/152 |
| 5,554,667 | * 9/1996 | Smith et al. | 522/81 |
| 5,932,337 | * 8/1999 | Edinger et al. | 428/319.3 |
| 5,936,005 | * 8/1999 | Askienazy et al. | 522/120 |

FOREIGN PATENT DOCUMENTS 0 539 916 A1 * 5/1993 (DE) .............................. C08G/59/42

* cited by examiner

Primary Examiner—Shrive Beck
Assistant Examiner—Jennifer Kolb
(74) Attorney, Agent, or Firm—Womble Carlyle Sandridge & Rice, PLLC

(57) ABSTRACT

The present invention relates to materials containing polyreaction products cured by UV radiation in presence of at least one UV initiator and/or electron radiation and/or IR radiation, planar structures based on renewable raw materials which contain these materials particularly in the coating layer, and methods of the production of said planar structures.

25 Claims, 1 Drawing Sheet

MATERIAL CONTAINING POLYREACTION PRODUCTS FOR THE COATING LAYER OF PLANAR STRUCTURES

FIELD OF THE INVENTION

The present invention relates to materials containing polyreaction products, planar structures based on renewable raw materials which contain these materials particularly in the coating layer and cover coat, respectively, and methods of the production of said planar structures.

Linoleum as an elastic floor covering based on renewable raw materials has long been known. Due to its natural components linoleum has achieved a high value regarding construction-biological and ecological areas. Nevertheless, the production of linoleum coverings requires a thermal treatment in the last method step, the so-called "ripening time", which takes several weeks.

DE-A-41 35 664 teaches coating masses which are based on renewable raw materials and serve to coat planar textile structures or release paper. The coating masses consist of a combination of epoxidation products of esters of unsaturated fatty acids and partial esters of polycarboxylic acids with polyether polyols as well as with a hydrophobing agent. These coating masses are used to produce floor coverings. However, the fact that the uppermost layer of coatings produced in this manner is very rough and non-transparent and exhibits a coloration caused by the thermal cross-linking is a disadvantage. Furthermore, the coatings of the back require a complicated production with rather expensive separating paper and have no foam and, therefore, are not comfortable when walked on. Furthermore, it turns out that the surface of these coverings is not sufficiently stain-repellent and not fully hardened.

BACKGROUND OF THE INVENTION

WO-96/15203 teaches coatable and, respectively, spreadable coating masses for the production of planar structures based on renewable raw materials. However, the production of these planar structures, particularly the coating layer and the wear layer, respectively, is carried out by thermal cross-linking of the coating masses, which results in yellowing of the coating layer.

SUMMARY OF THE INVENTION

Thus, the problem underlying the present invention is to provide novel planar structures based on renewable raw materials which do not require the time-intensive ripening time of linoleum coverings and substantially do not show yellowing of the coating layer and wear layer, respectively. Furthermore, these planar structures should have excellent material properties.

DETAILED DESCRIPTION OF THE INVENTION

This problem is solved by the embodiments characterized in the claims. In particular, there is provided a material containing polyreaction products wherein the polyreaction products are obtainable by reacting of at least one di- or polycarboxylic acid or their derivatives or of a mixture thereof with at least one epoxidation product of a carboxylic acid ester or with a mixture of these epoxidation products and simultaneously or subsequent curing of the reaction product, wherein the reaction and/or curing is substantially carried out by (a) UV radiation in presence of at least one UV initiator and/or (b) electron radiation optionally in presence of at least one UV initiator and/or (c) IR radiation.

UV initiators used in the present invention may be radical or cationic UV initiators, or a mixture of said types of UV initiators. Preferred examples of radical UV initiators are benzophenone, benzophenone derivatives, phosphine oxides, α-morpholino ketones, quinone, quinone derivatives or α-hydroxy ketones, or mixtures thereof. Preferred examples of cationic UV initiators are triarylsulfonium salts which may be of one type or a mixture of different triarylsulfonium salts, or diaryliodonium salts, or mixtures thereof. Said UV initiators are present, for example, in an amount up to 8% by weight, preferably 0.1 to 3% by weight, based on the amount of the material containing polyreaction products.

In one embodiment of the present invention, besides the UV initiator, at least one photosensitizer may be present, such as e.g. compounds based on anthracene, perylene or thioxanthene-9-one, which is able to activate the UV initiator and to enhance the effectiveness thereof, thereby reducing the concentration of the UV initiator. UV radiation employed in the present invention is, generally, within the usual range, i.e. 200 nm to 380 nm. IR radiation employed in the present invention is, generally, within the usual range, for example, 760 nm to 0.5 mm.

The di- or polycarboxylic acids or their derivatives preferably contain at least one double bond per molecule.

The dicarboxylic acid used can preferably be maleic acid, itaconic acid, fumaric acid, succinic acid, methylsuccinic acid, malic acid or furandicarboxylic acid, or a mixture thereof containing at least two of these acids. The polycarboxylic acid used can preferably be acids with three or more carboxylic acid groups such as e.g. citric acid and aconitic acid.

Anhydrides or partial esters or derivatives having at least one free carboxylic acid group can be used as derivatives of di- or polycarboxylic acids. The alcohol component of the partial esters is not subject to any particular limitation; however, polyols such as dipropylene glycol, propane diols, butane diols, hexane diols, hexane triols, glycerin or pentaerythrite, or a mixture thereof containing at least two of these polyols are preferably used as alcohol component.

In an especially preferred embodiment, as a cross-linking agent, a mixture of a partial ester of maleic acid anhydride and dipropylene glycol is used together with citric acid, wherein the portion of citric acid is up to 50% by weight, more preferably up to 25% by weight, based on the total amount of the cross-linking agent.

The epoxidation product preferably contains more than one epoxy group per molecule. The following can be used with preference as epoxidation product of a carboxylic acid ester: Epoxidized linseed oil, epoxidized soybean oil, epoxidized castor oil, epoxidized rape-seed oil or vernonia oil, or a mixture thereof containing at least two of these epoxidized products. The previously defined alcohols of partial esters such as e.g. dipropylene glycol, propane diols, butane diols, hexane diols, hexane triols or pentaerythrite, or a mixture thereof containing at least two of these polyols can also be used as the alcohol component of these carboxylic acid esters. The carboxylic acid component is not subject to any particular limitation.

Furthermore, the material containing polyreaction products may contain further at least one additive selected from the group consisting of fillers, pigments for designing and patterning, respectively, expanding agents and/or foaming agents, hydrophobing agents and auxiliary substances.

The fillers are preferably wood dust, chalk, cork dust, barium sulfate, silicic acid, kaolin, lignin, cellulose, talcum, glass, textile fibers or glass fibers or plant fibers, cellulose fibers, polyester fibers or e.g. colored granulates and chips, respectively, made of the inventive material containing polyreaction products, or a mixture thereof containing at least two of these substances. Wood dust, chalk, cellulose, lignin or cork dust, or a mixture thereof containing at least two of these substances are especially preferred as filler.

The following can be used by way of example as auxiliary substances: Tall oils, synthetic or natural resins such as e.g. balsamic resin, copals, hydrocarbon resins and/or siccatives such as e.g. compounds of the metals Al, Li, Ca, Fe, Mg, Mn, Pb, Zn, Zr, Ce or Co, or a combination thereof containing at least two of these compounds.

The invention is further directed to a planar structure composed of at least one support layer (I) and of at least one coating layer (II) which comprises the material containing polyreaction products as defined above, optionally an back layer (III) arranged under the support layer (I) and made of a chemically or mechanically foamed foam layer, optionally an compact or priming layer (IV) arranged between the support layer (I) and the coating layer (II) and/or between the support layer (I) and the back layer (III), optionally an chemically foamed foam layer (V) arranged under the coating layer (II), wherein the coating masses for the layers (II), (III), (IV) and (V) contain a material containing polyreaction products as defined above, with the proviso that the curing of the material containing polyreaction products contained in the layers (III), (IV) and (V) is at least partially carried out by:

(a) UV radiation in the presence of at least one UV initiator and/or (b) electron radiation optionally in the presence of at least one UV initiator and/or (c) IR radiation and/or (d) thermally, wherein no UV initiators are required when curing by IR radiation or thermal curing of the layers (III), (IV) and (V).

The inventive planar structures, i.e. floor coverings or tiles, are manufactured. such that a combination of the above defined di- or polycarboxylic acids and their derivatives, respectively, and epoxidation products mixed in the weight ratio of 1:0.3 to 1:8, particularly 1:0.5 to 1:3, 1:0.6 to 1:1.2 and 1:1 to 1:4, fillers and, in the case of the mass for the coating layer, optionally hydrophobing agents, and in the case of the mass for a chemical foam, a foaming agent, and optionally a foam stabilizer for each foam compound, is mixed and processed to form a paste, and these pastes are then processed in a known way to form multi-layer floor coverings. The coating mass for the coating layer (II) contains preferably 7 to 44% by weight hydrophobing agent, based on the amount of the material containing polyreaction products.

The coat pastes for the planar structure according to the present invention all may contain greater quantities of filler, wherein, preferably, amounts from 10% by weight to 60% by weight, preferably 30% by weight, are used in the compact layer and 20 to 65% by weight, preferably 35% by weight, in the chemical foam, whereas only little, preferably no more than 10% by weight, e.g. 1 to 10% by weight, more preferably no more than 5% by weight, filler are usually contained in the compounds for the mechanical foam. All percentage particulars refer to the total quantity of the material containing polyreaction products, when not specified to the contrary.

The coating layer (II) may be transparent or may have any desired pattern by admixing of the additives as defined above such as cellulose. In case the coating layer is transparent, the coating mass for the coating layer (II) contains preferably no more than 8% by weight, more preferably no more than 2% by weight, fillers. Further, if the coating layer (II) is transparent, the layer lying therebelow can then be printed on, and, thus, a printed planar structure is obtained that has high mechanical strength and extremely good dirt-repellant properties. A multi-layer covering having a parquet pattern as well as enameled cloth and synthetic leather or protective layers for glass can be mentioned as examples of such an employment.

The coverings contain comparatively high proportions of additives, particularly mineral fillers from the group of chalk, barium sulfate, silicic acid, kaolin and talcum but optionally also comparatively high proportions of sawdust, cork dust, ground glass, cellulose, lignin, textile filaments or plant fibers, which may also be present in the mixture, wherein the quantity of fillers in the overall floor covering can amount to up to 70% by weight, preferably 30 to 60% by weight in the case of foam-free coverings, and preferably 40 to 60% by weight of the overall floor covering in the case of floor coverings having chemically foamed layers.

With respect to masses for the chemically foamed layers, the quantity of foaming agent lies in the standard range up to approximately 15% by weight, and other standard auxiliaries can amount, for example, up to 15% by weight.

The floor coverings are preferably composed of three, four or five layers, for example, a simple structure built up of an optionally printed support such as paperboard, a coating layer and a protective layer, or a structure built up of a compact layer, an optional chemical foam layer, a transparent coating layer and a support layer and, optionally, a chemically foamed back layer, wherein the chemical foam, of course, can also be replaced by a mechanical foam or wherein both types of foam can be present. When a chemically foamed layer (V) is arranged between the compact layer and the coating layer, this can be chemically embossed in a specific embodiment of the invention. This chemically foamed layer (V) may also comprise the material containing polyreaction products, preferably cured by UV radiation, as defined above. To that end, a paste is applied on the compact layer. This paste contains an expander and a kicker; what is meant by this are polyols, urea, zinc, lead or cadmium compounds, whereby ZnO is preferred. These lower the decomposition temperature of the expander. The paste coat is then crosslinked below the decomposition temperature of the expander. In the next fabrication stage, the coated paste is provided with a rotogravure pattern. An inhibitor is added to the inks that should be dark and deep, respectively, in the finished covering. The inhibitor weakens the effect of the kicker or entirely cancels it, so that the decomposition of the expander is shifted towards higher temperatures. Suitable substances having inhibitor effect are, for example, benzotriazol derivatives, trimellitic acid anhydride and the like. Various relief depths can be achieved by varying the quantity of added inhibitor. A protective layer (VI) of polymers or, respectively, copolymerizates or waxes can then be arranged over this chemically foamed layer with applied relief pattern and the coating layer lying above it. Examples of these unsaturated, curable lacquer systems are polyacrylates, polymethacrylates, polyurethanes and mixtures thereof. However, carnauba wax can also be utilized. The protective layer should be manufactured from (co) polymers compatible with the coating layer.

It surprisingly turned out that, when curing the coating masses for the coating layer (II) by UV radiation, electron radiation and IR radiation, respectively, the planar structures according to the present invention substantially do not show coloration, particular yellowing, of the coating layer and wear layer, respectively.

Further subject matter of the present invention relates to a method of fabricating the aforementioned planar structure, wherein at least the coating layer (II) is substantially cured by UV radiation in the presence of at least one UV initiator as defined above, which is compounded into the mixture for the layer to be cured, and/or by electron radiation optionally in presence of at least one UV initiator and/or IR radiation.

In particular, this is a matter of a continuous process that, similar to CV manufacture, successively describes an overall structure of a floor covering with different pastes. As already mentioned, such a method can also comprise foaming, particularly chemical foaming, and leads to a covering that can be printed.

In one embodiment of the method of the present invention, the coating layer (II) is partially cured by UV radiation, followed by embossing the partially cured coating layer (II) and then curing the embossed, partially cured coating layer (II) by UV radiation and/or electron radiation and/or IR radiation and/or thermally.

The manufacture of the covering ensues, for example, in that the constituents are mixed to form a paste, applied in an appropriate thickness on a web with coating devices, optionally foamed and solidified in a known way. Layers containing foaming agent and layers free of foaming agent can also be unified to form a web and can be foamed and solidified simultaneously or in successive steps.

As auxiliary substances, acrylates such as, for example, poly(methyl methacrylate) may be worked into the wear layer in order to improve the adhesion between the applied ultraviolet lacquer and the wear layer, i.e. the coating layer. Linseed oil in amounts of up to 15% by weight can also be contained in the coating layer as an auxiliary.

1 to 5% by weight of azodicarboxylic acid amide or sulfohydrazides can be employed as foaming agent (expander) for the back layer, wherein, in particular, 3% by weight of foaming agent are preferred. As already mentioned above, kickers can also be utilized in the chemical embossing process in order to lower the decomposition temperature of the foaming agent. In particular, zinc oxide is utilized here according to the present invention.

EXAMPLES

Figure 1:
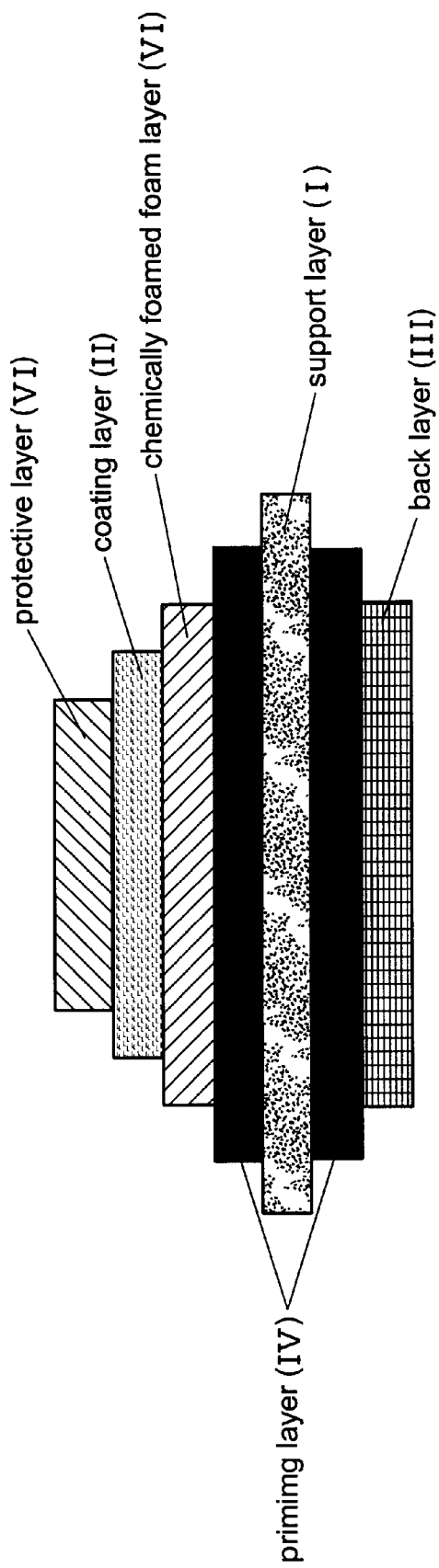
FIG. 1 shows a preferred embodiment of the planar structures according to the present invention composed of a support layer (I) which has a priming layer (IV) on both sides thereof, a back layer (III) arranged therebelow, a chemically foamed foam layer (V) arranged on the priming layer lying above, a coating layer (II) arranged above and a protective layer (VI) arranged above the coating layer.

In another embodiment of the present invention, the material containing polyreaction products according to the present invention can be used as a back surface coating for textile planar structures such as floor coverings.

The present invention is explained in detail in the following examples showing UV cross-linking of the coating layer in preferred ranges of the used constituents.

Example 1

51 g of epoxidized linseed oil are mixed with 1.1 g of a cationic photoinitiator based on triarylsulfonium salt, 2 g of highly disperse silicic acid, 3 g of poly(methyl methacrylate) and 2 g of linseed oil. Then, 48 g of a partial ester of maleic acid anhydride and dipropylene glycol are added and the mixture is compounded in a commercially available laboratory dissolver.

After degassing of the mixture the mass is blade coated onto a paperboard support and cured by UV light having a wavelength of 295 nm to 400 nm. The coating layer thus obtained is colourless and non-adhesive (non-sticky).

Example 2

51 g of epoxidized linseed oil are mixed with 0.8 g of a cationic photoinid on a triarylsulfonium salt, 2 g of highly disperse silicic acid, 3 g of poly)methacrylate) and 2 g of linseed oil. Then, 15 g of a 25% by weight solution of citric acid in a partial ester of maleic acid anhydride and dipropylene glycol are added and the mixture is compounded in a commercially available laboratory dissolver.

After degassing of the mixture the mass is blade coated onto a paperport board support and cured by UV light having a wavelength of 295 nm to 400 nm. The coating layer thus obtained is colourless and non-adhesive (non-sticky).

What is claimed is:

1. A method of fabricating a planar structure having at least one support layer (I) and at least one coating layer (II), optionally a back layer (III) arranged under the support layer (I) and made of a chemically or mechanically foamed foam layer, optionally a compact or priming layer (IV) arrange between the support layer (I) and the coating layer (II) and/or between the support layer (I) and the back layer (III), optionally a chemically foamed foam layer (V) arranged under the coating layer (II), wherein the coating masses for the layers (II), (III), (IV) and (V) contain a material containing polyreaction products being obtainable by reacting of at least one di- or polycarboxylic acid or their derivatives or of a mixture thereof with at least one epoxidation product of a carboxylic acid ester or with a mixture of these epoxidation products, wherein at least the coating layer (II) is substantially cured by UV radiation in the presence of at least one UV initiator which is compounded into the mixture for the layer to be cured, and/or by electron radiation.

2. The method according to claim 1, wherein the coating layer (II) is partially cured by UV radiation, followed by embossing the partially cured coating layer (II) and then curing the embossed, partially cured coating layer (II) by UV radiation and/or electron radiation and/or IR radiation and/or thermally.

3. The method according to claim 3, wherein the UV initiator is a radical or cationic UV initiator or a mixture thereof.

4. The method according to claim 3, wherein the radical UV initiator is benzophenone, a benzophenone derivative, a phosphine oxide, a α-morpholino ketone, quinone, a quinone derivative or a α-hydroxy ketone, or a mixture thereof.

5. The method according to claim 3, wherein the cationic UV initiator is a triarylsulfonium salt or a mixture of different triaiylsulfonium salts, or a diaryliodonium salt or a mixture thereof.

6. The method according to claim 1, wherein the UV initiator is present in an amount up to 8% by weight, based on the amount of the material containing polyreaction products.

7. The method according to claim 1, wherein the material containing polyreaction products further comprises at least one additive selected from the group consisting of fillers, pigments, expanding agents, hydrophobing agents and auxiliary substances.

8. The method according to claim 1, wherein the dicarboxylic acid in the material containing polyreaction products is maleic acid, itaconic acid, fumaric acid, succinic acid, methylsuccinic acid, malic acid or furandicarboxylic acid, or a mixture thereof containing at least two of these acids.

9. The method according to claim 1, wherein the polycarboxylic acid in the material containing polyreaction products is selected from citric acid or aconitic acid.

10. The method according to claim 1, wherein the derivative of the di- or polycarboxylic acid in the material containing polyreaction products is an anhydride or a partial ester.

11. The method according to claim 10, wherein the alcohol component of the partial ester is a polyol.

12. The method according to claim 11, wherein the polyol is dipropylene glycol, a propane diol, a butane diol, a hexane diol, a hexane triol, glycerin or pentaerythrite, or a mixture thereof containing at least two of these polyols.

13. The method according to claim 1, wherein the mixture of at least one di- or polycarboxylic acid or the derivatives thereof is a mixture of a partial ester of maleic acid anhydride and dipropylene glycol with citric acid.

14. The method according to claim 1, wherein the epoxidation product of a carboxylic acid ester contains more than one epoxy group per molecule.

15. The method according to claim 1, wherein the epoxidation product of a carboxylic acid ester is epoxidized linseed oil, epoxidized soybean oil, epoxidized castor oil, epoxidized rape-seed oil or vernonia oil or a mixture thereof containing at least two of these epoxidized products.

16. The method according to claim 7, wherein the filler is wood dust, chalk, cellulose, lignin or cork dust, or a mixture thereof containing at least two of these substances.

17. The method according to claim 7, wherein the auxiliary substance is selected from the group consisting of tall oils, synthetic or natural resins and siccatives.

18. The method according to claim 1, wherein the coating layer (II) is transparent.

19. The method according to claim 1, wherein a chemical foam layer (V) for chemical embossing is arranged under the coating layer (II).

20. The method according to claim 1, wherein a protective layer (VI) made of unsaturated curable lacquer system is arranged above the coating layer (II), wherein the polymers or copolymers for the lacquer systems are selected from the group consisting of polyacrylates, poly(meth)acrylates, polyurethanes, and mixtures thereof.

21. The method according to claim 1, wherein the coating mass for the coating layer (II) further contains a hydrophobing agent.

22. The method according to claim 1, wherein the coating mass for the coating layer (II) contains no more than 8% by weight fillers.

23. The method according to claim 1, wherein the coating mass for the compact or priming layer (IV) contains 10 to 60% by weight fillers, based on the amount of the material containing polyreaction products.

24. The method according to claim 1, wherein the coating mass for the chemically foamed foam layer (V) contains 20 to 65% by weight fillers, based on the amount of the material containing polyreaction products.

25. The method according to claim 1, wherein the coating mass for the mechanically foamed foam layer (V) contains up to 10% by weight fillers, based on the amount of the material containing polyreaction products.

* * * * *